(12) United States Patent
Hsu

(10) Patent No.: US 10,337,937 B1
(45) Date of Patent: Jul. 2, 2019

(54) DETECTION DEVICE FOR DIGITAL TORQUE ADAPTER

(71) Applicant: Chih-Hsiang Hsu, Taipei (TW)

(72) Inventor: Chih-Hsiang Hsu, Taipei (TW)

( * ) Notice: Subject to any disclaimer, the term of this patent is extended or adjusted under 35 U.S.C. 154(b) by 0 days.

(21) Appl. No.: 15/983,111

(22) Filed: May 18, 2018

(51) Int. Cl.
 *G01L 5/00* (2006.01)
 *G01L 5/24* (2006.01)
 *G01C 9/06* (2006.01)

(52) U.S. Cl.
 CPC . *G01L 5/24* (2013.01); *G01C 9/06* (2013.01)

(58) Field of Classification Search
 CPC .................................... G01L 5/24; G01C 9/06
 USPC ...................................................... 73/862.23
 See application file for complete search history.

(56) References Cited

U.S. PATENT DOCUMENTS

| | | | | |
|---|---|---|---|---|
| 4,818,157 A * | 4/1989 | Kouvelis | ............... | B23B 31/005 279/145 |
| 5,589,644 A * | 12/1996 | Becker | ................ | B25B 23/1425 73/862.21 |
| 6,629,055 B2 * | 9/2003 | McGee | ................... | B25B 23/14 702/113 |
| 2003/0065456 A1 * | 4/2003 | McGee | ................... | B25B 23/14 702/41 |
| 2003/0196497 A1 * | 10/2003 | Geilenbrugge | ......... | B25B 23/14 73/862.338 |
| 2008/0314193 A1 * | 12/2008 | Meggiolan | ............... | B62M 3/00 74/594.1 |

* cited by examiner

Primary Examiner — Max H Noori

(57) ABSTRACT

A detection device for a digital torque adapter includes a case having an operation area and a display area located on the outside thereof. A torque strain axle extends through the case. A recess is defined in one end of the torque strain axle. A circuit board having a receiving unit and a setting unit is electrically connected to the operation area and the display area. The case has a torque strain gauge located on the outer surface of the torque strain axle. An angle sensor is located in the case and detects the angle of the case and the torque strain axle relative to a horizontal plane. An accumulator is electrically connected to the circuit board and accumulates the angle detected by the angle sensor of each time that the wrench rotates, until the sum meets a pre-set value of angle of the setting unit.

10 Claims, 6 Drawing Sheets

DETECTION DEVICE FOR DIGITAL TORQUE ADAPTER

BACKGROUND OF THE INVENTION

1. Fields of the Invention

The present invention relates to a detection device for a hand tool, and more particularly, to a detection device for a digital torque adapter so as to provide data of accumulation of angles that the hand tool operates.

2. Descriptions of Related Art

The conventional torque wrench is designed to apply a proper torque to an object so as to protect the object from being damaged due to exceeded torque applied thereto. A pre-set torque is set before the torque wrench actually applies to the object such as a nut or a bolt. Some of the torque wrenches display the output torque of the torque to allow the users to stop overly rotate the object. However, the displayed output torque is available when the wrench is rotated over 90 degrees, so that when the wrench is used in a narrow space, such as the narrow space only allows the wrench to rotate 130 degrees, and when reversing the wrench, the display will be re-set to be zero. In this case, the user of the conventional torque wrench cannot be acknowledged the angle that the wrench really rotates.

The present invention intends to provide a detection device for a digital torque adapter to eliminate the drawbacks mentioned above.

SUMMARY OF THE INVENTION

The present invention relates to a detection device for a digital torque adapter which is connected with a wrench or a socket. The detection device comprises a case having an operation area and a display area respectively defined in the outside thereof. A torque strain axle extends through two opposite ends of the case and has a recess 21 defined in the first end thereof. The second end of the torque strain axle is exposed beyond the case. A circuit board is located in the case and electrically connected to the operation area and the display area. The circuit board includes a receiving unit and a setting unit. The operation area activates the circuit board to operate the setting unit. The case has a torque strain gauge located therein which is attached to the outer surface of the torque strain axle to detect a value of torque which is transferred to the receiving unit. The circuit board includes a screen which is located at the display area. An angle sensor is located in the case and detects an angle of the case and the torque strain axle relative to a horizontal plane. The angle sensor detects the angle which is transferred to the receiving unit and displayed on the screen. An accumulator is electrically connected to the circuit board and accumulates the angle detected by the angle sensor of each time that the wrench rotates, until the sum of the accumulated angles meets a pre-set value of angle of the setting unit. The display area displays the value of torque and the sum of the accumulated angles.

Preferably, the accumulator accumulates the angles detected by the angle sensor by way of phase accumulation.

Preferably, the angle sensor is a gyroscope integrated circuit.

Preferably, the operation area includes a start button which is pushed to activate the circuit board. The circuit board is reset by pushing the start button two times rapidly. The circuit board is shut off by pressing the start button for three seconds.

Preferably, the operation area includes an up button and a down button. The up button and the down button adjust the pre-set value of angle set by the setting unit.

Preferably, the operation area includes a measurement system selection button, and two measurement systems set in the setting unit of the circuit board are selected by pressing the unit selection button. The measurement systems of the circuit board include a metric system Nm and Kg·cm, and an English system lbf·in and lbf·ft.

Preferably, the operation area includes a set button, and the pre-set value of the setting unit of the circuit board is adjusted by pressing the set button. The up button and down button are operated to adjust digits of the pre-set value of the setting unit.

Preferably, the operation area includes a mold selection button, and the mold selection button selects one of a tracking mode, a peak mold and an angle mold that are built in the setting unit of the circuit board. When the tracking mode is chosen, a pre-set value of torque is input to the tracking mold, and the tracking mode tracks a value of torque of each time that the wrench rotates, and displays the value of torque on the screen. The value of torque jumps to the pre-set value of torque when the wrench is stopped to rotate and released. When the peak mold is chosen, a pre-set value of torque is input to the peak mold, and the peak mold detects the value of torque of each time that the wrench rotates and displays the value of torque on the screen. A final value of torque is displayed on the screen. The screen flashes for seconds and then displays the pre-set value of torque, or the start button is pressed to initialize the peak mode. When the angle mode is chosen, a pre-set value of angle is input to the angle mold and the screen displays the angle of each time that the wrench rotates. The screen cross-displays the final value of angle and the value of torque when the wrench is stopped. The screen flashes for seconds and then displays the pre-set value of angle, or the start button is pressed to initialize the angle mode.

Preferably, the operation area includes a turn button, a display pattern of the screen is rotated by pressing the turn button.

Preferably, the case includes a buzzer and at least one warning light. The buzzer and the at least one warning light are electrically connected to the circuit board. When the value of torque that the wrench outputs is smaller than 80% of the pre-set value of torque, the at least one warning light turns on and displays a first color. When the value of torque that the wrench outputs is larger than 80% of the pre-set value of torque, the at least one warning light turns on and displays a second color, and the buzzer generates a first sound at a first frequency. When the value of torque that the wrench outputs is close to 95% of the pre-set value of torque, the at least one warning light turns on and displays the second color, and the buzzer generates the first sound at a second frequency. When the value of torque that the wrench outputs reaches 100% of the pre-set value of torque, the at least one warning light turns on and displays a third color, and the buzzer generates a second sound which is a continuous sound. The buzzer turns silent the when the wrench is stopped to rotate.

Preferably, the at least one warning light turns on and displays a first color when an angle that the wrench rotates is less than 80% of the pre-set value of angle. When the value of angle that the wrench rotates is larger than 80% of the pre-set value of angle, the at least one warning light turns on and displays a second color, and the buzzer generates a first sound at a first frequency. When the value of angle that the wrench rotates is close to 95% of the pre-set value of angle, the at least one warning light turns on and displays the second color, and the buzzer generates the first sound at a second frequency. When the value of angle that the wrench rotates reaches 100% of the pre-set value of angle, the at least one warning light turns on and displays a third color, and the buzzer generates a second sound which is a continuous sound. The buzzer turns silent the when the wrench is stopped to rotate.

Preferably, the case includes a power supply, and the screen displays electric power status of the power supply.

The advantages of the present invention are that the users rotates the wrench according to a pre-set value of angle. The angle that the wrench rotates back and forth each time is accumulated by the accumulator until the sum of the accumulated angles meets the pre-set value of angle to finish the locking procedure to an object such as a bolt or nut. The present invention allows the user to operate the wrench in any space, without being restricted by the space, so that the wrench is rotated repeatedly to accumulate the angle that the wrench rotates to eventually precisely lock or unlock the object.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
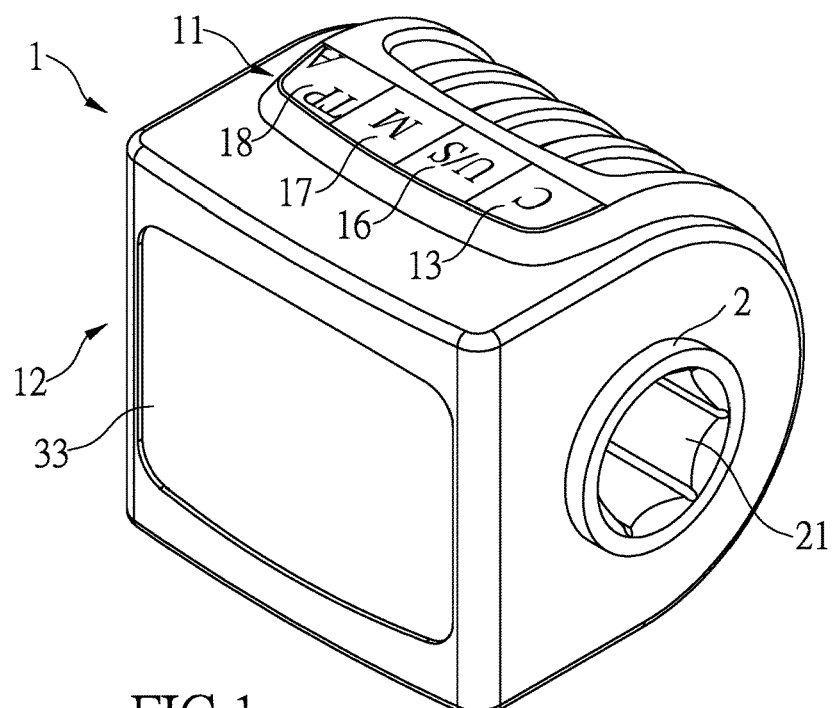
FIG. 1 is a perspective view to show the detection device for a digital torque adapter of the present invention.

Referring to FIGS. 1 to 6, the detection device for a digital torque adapter of the present invention is disclosed and the digital torque adapter is connected with a wrench 10 or a socket 20. The detection device of a digital torque adapter comprises a case 1 which is a fan-shaped cylindrical case 1 and has an operation area 11 and a display area 12 respectively defined in the outside thereof. A torque strain axle 2 extends through two opposite ends of the case 1, and has a recess 21 defined in the first end thereof. A driving member 22 is connected to the recess 21. The second end of the torque strain axle 2 is exposed beyond the case 1.

A circuit board 3 is located in the case 1 and electrically connected to the operation area 11 and the display area 12. The circuit board 3 includes a receiving unit 31 and a setting unit 32. The operation area 11 activates the circuit board 3 to operate the setting unit 32. A torque strain gauge 4 is located in the case 1 and attached to the outer surface of the torque strain axle 2 to detect a value of torque which is transferred to the receiving unit 31. The circuit board 3 includes a screen 33 which is located at the display area 12.

An angle sensor 5 is located in the case 1 and detects an angle of the case 1 and the torque strain axle 2 relative to a horizontal plane. The angle sensor 5 detects the angle which is then transferred to the receiving unit 31 and displayed on the screen 33. An accumulator 6 is electrically connected to the circuit board 3 and accumulates the angle detected by the angle sensor 5 of each time that the wrench rotates, until a sum of the accumulated angles meets a pre-set value of angle of the setting unit 32. The display area 12 displays the value of torque and the sum of the accumulated angles. Therefore, the users can operate the wrench 10 in a narrow space and is acknowledged the accumulated angle that the wrench has already rotated.

Figure 6:
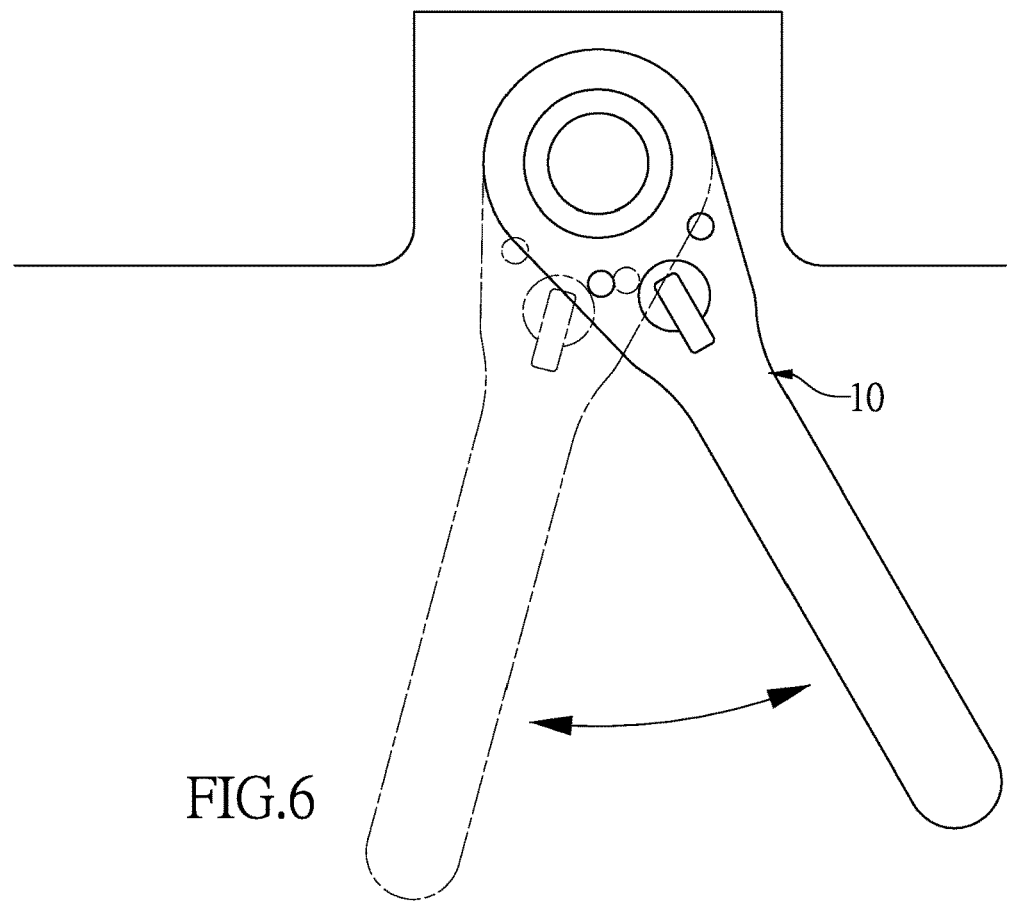
FIG. 6 shows that the wrench connected with the detection device for a digital torque adapter of the present invention is operated in a narrow space.
Figure 7:
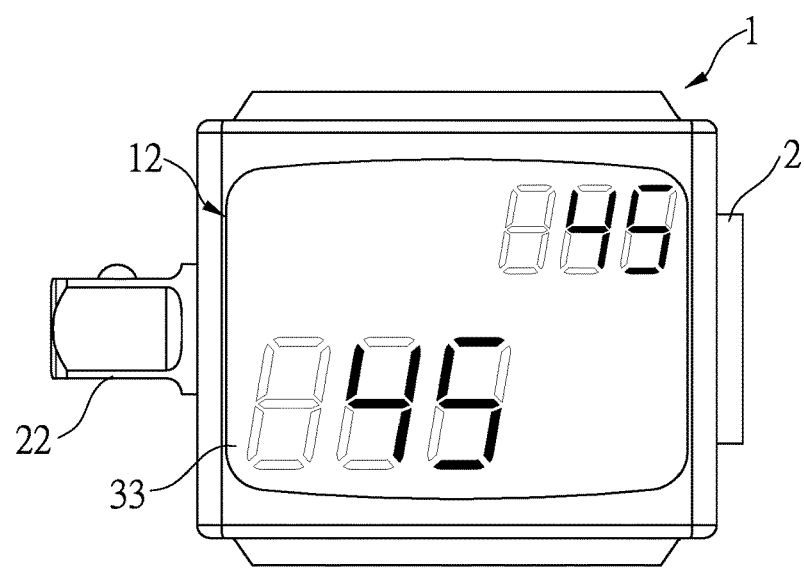
FIG. 7 shows that the screen of the detection device for a digital torque adapter of the present invention displays the angle of the first time of rotation of the wrench.
Figure 8:
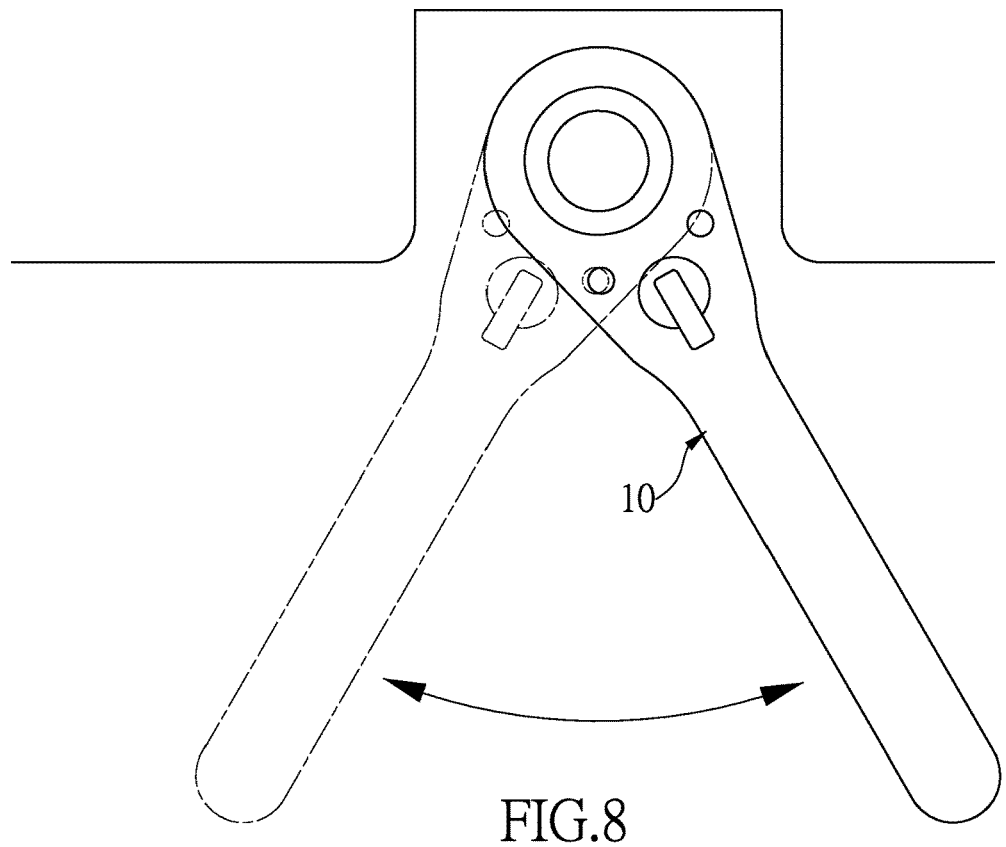
FIG. 8 shows that the wrench connected with the detection device for a digital torque adapter of the present invention is rotated second time in the narrow space.

A shown in FIGS. 6 to 9, by using the present invention, the users simply rotates the wrench 10 that is connected with a socket 20 to tighten an nut or the like in the narrow space. Assume the nut is required to be rotated 120 degrees, and the accumulator 6 accumulates the angles that the wrench rotates so that that user can check the value that accumulator 6 shows to perfectly operate the wrench 10 to rotate 120 degrees in a narrow space. In other words, the torque applied to the nut reaches the pre-set value when the wrench 10 rotates 120 degrees in multiple times of rotation. FIGS. 6 and 8 show two continuous rotations of the wrench 10, the first rotation is 45 degrees and then the wrench 10 is rotated back to the initial position, and the second time of rotation is 60 degrees and then the wrench 10 is rotated back to the initial position, wherein the solid lines represent the initial position, and the dotted lines represent the position that the wrench is rotated.

Figure 9:
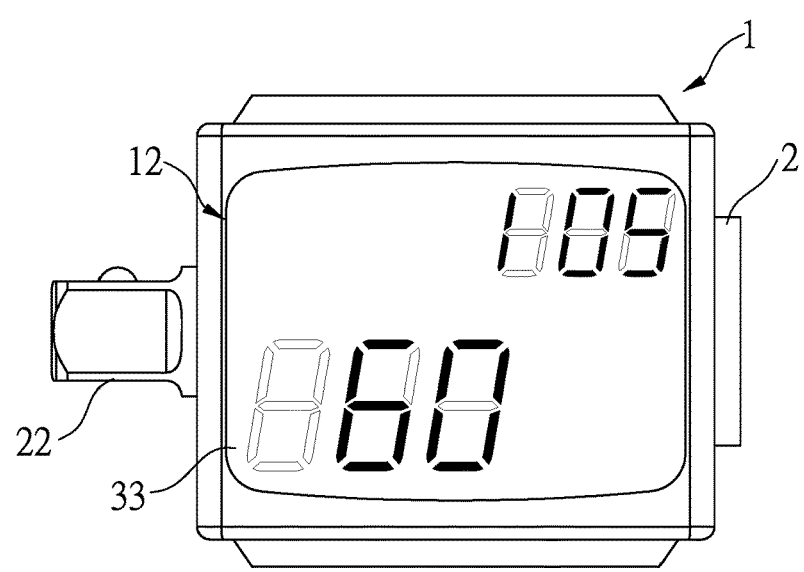
FIG. 9 shows that the screen of the detection device for a digital torque adapter of the present invention displays the accumulated angle of the second time of rotation of the wrench.

It is noted that the accumulator 6 accumulates the angles detected by the angle sensor 5 by way of phase accumulation. The screen 33 shows the sum of the angles that the wrench 10 is rotated. As shown in FIGS. 7 and 9, the detection of the change of the angles is made by the angle sensor 5 which is a gyroscope integrated circuit which is able to precisely detect the angle that the wrench 10 is rotated.

Figure 2:
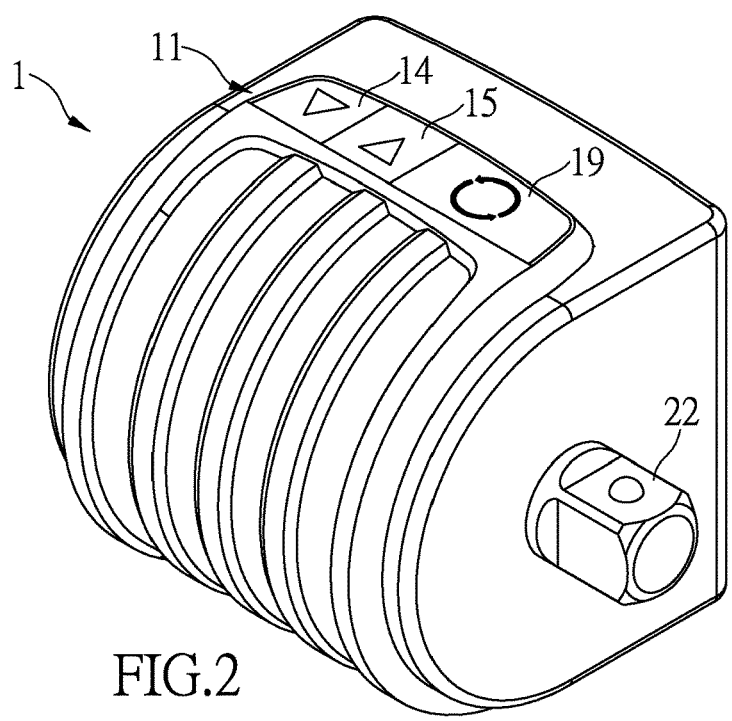
FIG. 2 is another perspective view to show the detection device for a digital torque adapter of the present invention.
Figure 3:
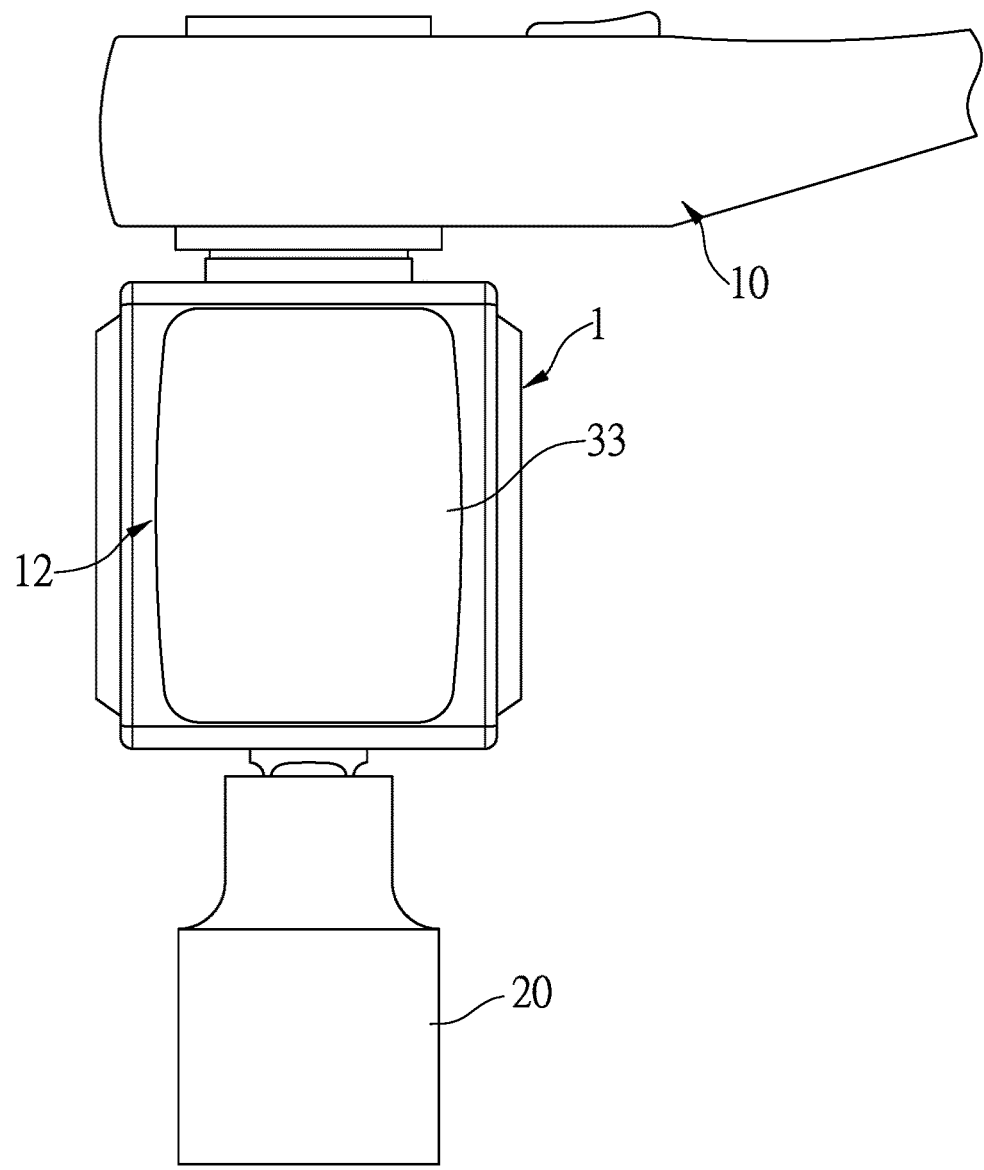
FIG. 3 is a side view show that the detection device for a digital torque adapter of the present invention is connected with a socket and a wrench.
Figure 4:
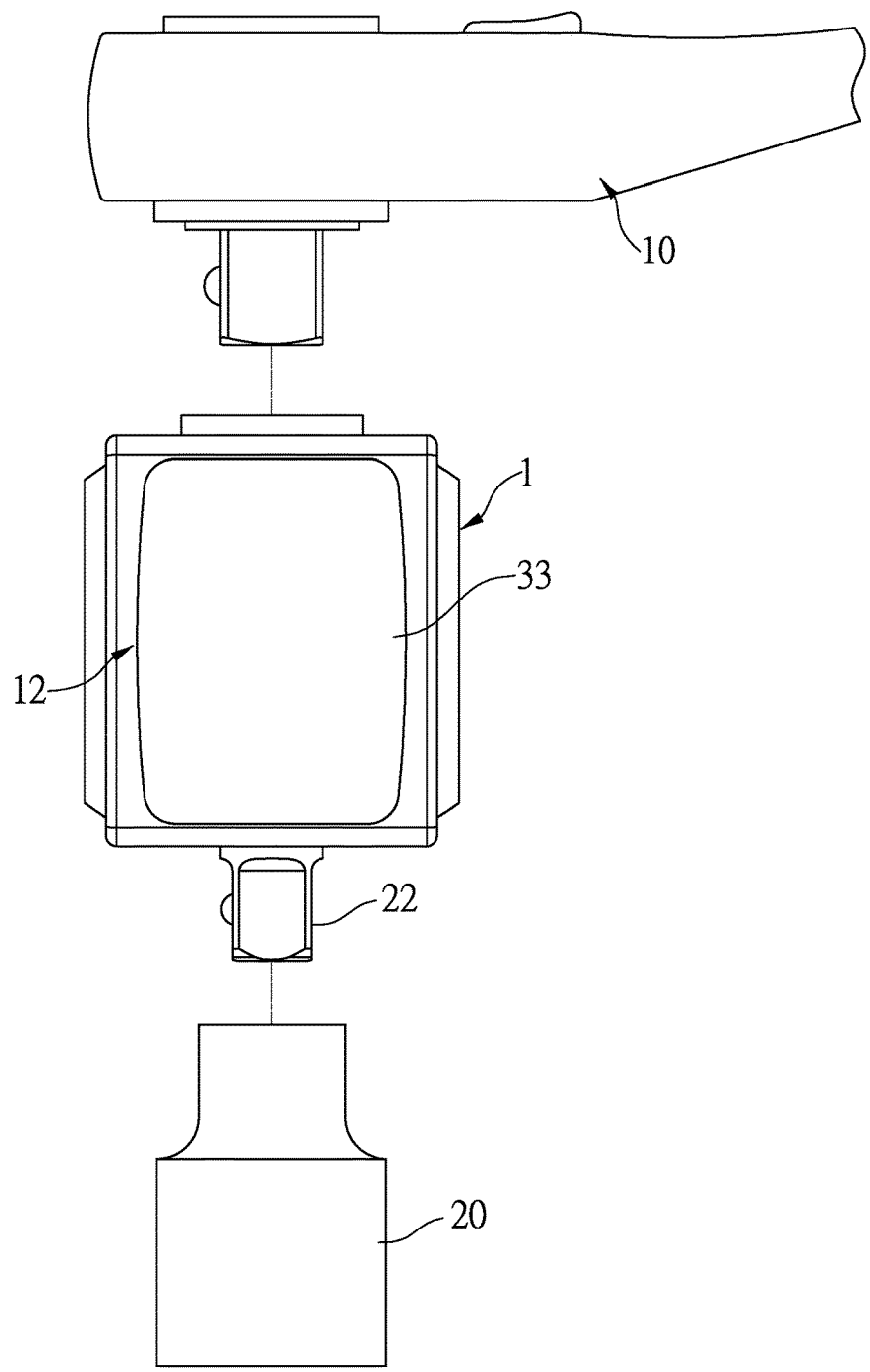
FIG. 4 is an exploded view to show the detection device for a digital torque adapter of the present invention, the socket and the wrench.

The operation area 11 includes a start button 13 which has a "C" mark on the button and is pushed to activate the circuit board 3. The circuit board 3 is reset by pushing the start button 13 two times rapidly, and the circuit board 3 is shut off by pressing the start button 13 for three seconds. The operation area 11 includes an up button 14 and a down button 15, wherein the up button 14 and the down button 15 are used to adjust the pre-set value of angle set by the setting unit 32. The operation area 11 further includes a measurement system selection button 16 which has a "U/S" mark on the button. The measurement system that is to be set in the setting unit 32 of the circuit board 3 is selected by pressing the unit selection button 16. The measurement of the circuit board 3 includes a metric system Nm and Kg·cm, and an English system lbf·in and lbf·ft. The users may choose the desired measurement system as needed as shown in FIGS. 1 and 2.

The operation area 11 includes a set button 17 which has an "M" mark on the button. A pre-set value of the setting unit 32 of the circuit board 3 is adjusted by pressing the set button 17, wherein the up button 14 and down button 15 are operated to adjust digits of the pre-set value of the setting unit 32.

The operation area 11 includes a mold selection button 18 which has a "T/P/A" mark on the button. The mold selection button 18 selects one of a tracking mode 321, a peak mold 322 and an angle mold 323 that are built in the setting unit 32 of the circuit board 3. When the tracking mode 321 is chosen, a pre-set value of torque, for example 50N-m, is input to the tracking mold 321. The tracking mode 231 tracks the value of torque of each time that the wrench 10 rotates. The value of torque is changed and displayed on the screen 33 from "0000". The value of torque jumps to the pre-set value of torque (50 N-m) when the wrench 10 is stopped to rotate and released. This is convenient for the user to check if the sum of the torque applied to the nut is not exceed 50 N-m to protect the nut and the torque strain axle 2. When the peak mold 322 is chosen, a pre-set value of torque (50 N-m for example) is input to the peak mold 322. When the wrench 10 is rotated, the value of torque is changed and displayed on the screen 33 from "0000". A final value of torque is displayed on the screen 33 when the wrench 10 is stopped to rotated, and the screen 33 flashes for about 10 seconds so that the user may check the final torque. After the flashing about 10 seconds, the screen 33 displays the pre-set value of torque, or the start button 13 is pressed to initialize the peak mode 322, or the user applies a torque to the nut again. When the angle mode 323 is chosen, a pre-set value of angle (120 degrees for example) is input to the angle mold 323 and the screen 33 displays the angle of each time that the wrench 10 rotates. When the wrench 10 is rotated back to its initial position, the displayed angle returns to "0". When the wrench 10 is rotated again, the screen 33 displays the sum of the angles of the two rimes of rotation of the wrench 10, until the final value of angle reaches 120 degrees. The screen 33 cross-displays the final value of angle and the value of torque when the wrench 10 is stopped to rotate. The screen 33 flashes for about 10 seconds and then displays the pre-set value of angle again to complete the detection, or the start button 13 is pressed to initialize the angle mode 323, as shown in FIGS. 5 to 9.

Figure 5:
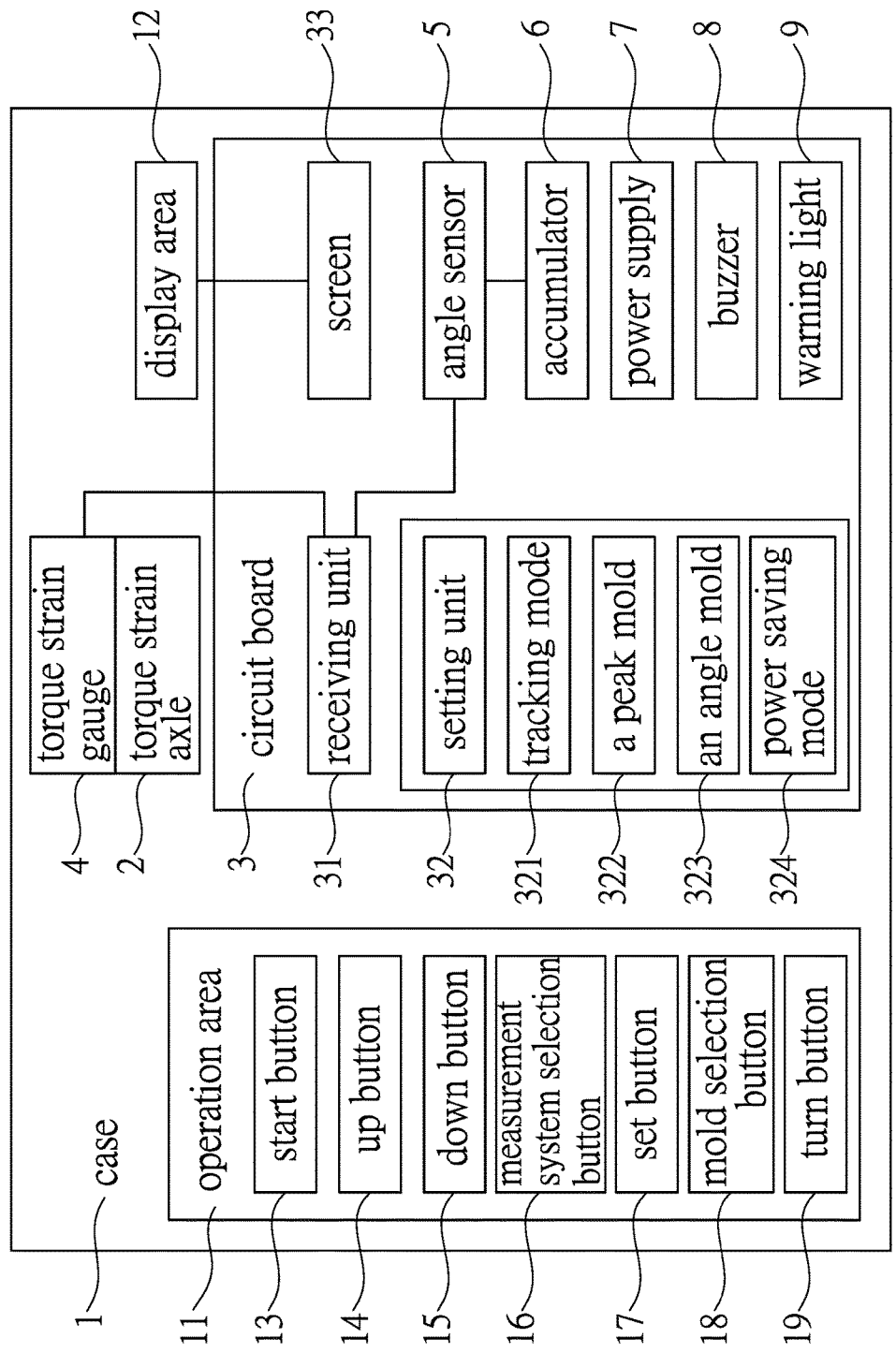
FIG. 5 shows the block diagram of the detection device for a digital torque adapter of the present invention.

The operation area 11 includes a turn button 19 which has a mark  on the button. The display pattern, rotating 180 degrees for example, of the screen 33 is rotated by pressing the turn button 19 as shown in FIG. 2. The case 1 includes a power supply 7 which provides power to the circuit board 3 and the accumulator 6. The screen 33 displays the electric power status of the power supply 7. There are four blocks to show the electric status of the power supply 7. When the power is full, four blocks light up. When the power is less than 2.8V, three blocks light up. When the power is less than 2.6V, two blocks light up. When the power is less than 2.4V, one block lights up. The function of the circuit board 3 is stopped when the power status is less than 2.3V, and the screen 33 shuts down after 5-second flashing. When the start button 13 and the up button 14 are simultaneously pressed for 5 seconds, the device is re-set to the original setting. When the start button 13 and the down button 15 are simultaneously pressed for 5 seconds, the back-light feature of the screen 33 is activated or the screen is shut off. If the device is not used for over 2 minutes, the devices undergoes a power saving mode 324 that is built in the setting unit 32, and the device returns to the operational status by pressing the start button 13 again as shown in FIG. 5.

The case 1 includes a buzzer 8 and at least one warning light 9, wherein the buzzer 8 and the at least one warning light 9 are electrically connected to the circuit board 3. When the value of torque that the wrench outputs is smaller than 80% of the pre-set value of torque, the at least one warning light 9 turns on and displays a first color. When the value of torque that the wrench 10 outputs is larger than 80% of the pre-set value of torque, the at least one warning light 9 turns on and displays a second color, and the buzzer 8 generates a first sound at a first frequency. When the value of torque that the wrench 10 outputs is close to 95% of the pre-set value of torque, the at least one warning light 9 turns on and displays the second color, and the buzzer 8 generates the first sound at a second frequency. When the value of torque that the wrench 10 outputs reaches 100%/o of the pre-set value of torque, the at least one warning light 9 turns on and displays a third color, and the buzzer 8 generates a second sound which is a continuous sound. The buzzer 8 turns silent the when the wrench 10 is stopped to rotate. When the user chooses the angle mode 323, the at least one warning light 9 turns on and displays a first color when an angle that the wrench 10 rotates is less than 80% of the pre-set value of angle. When the value of angle that the wrench 10 rotates is larger than 80% of the pre-set value of angle, the at least one warning light 9 turns on and displays a second color, and the buzzer 8 generates a first sound at a first frequency. When the value of angle that the wrench 10 rotates is close to 95% of the pre-set value of angle, the at least one warning light 9 turns on and displays the second color, and the buzzer 8 generates the first sound at a second frequency. When the value of angle that the wrench 10 rotates reaches 100% of the pre-set value of angle, the at least one warning light 9 turns on and displays a third color, and the buzzer 8 generates a second sound which is a continuous sound. The buzzer 8 turns silent the when the wrench 10 is stopped to rotate. This feature ensures that the user can carefully operates the wrench 10.

While we have shown and described the embodiment in accordance with the present invention, it should be clear to those skilled in the art that further embodiments may be made without departing from the scope of the present invention.

What is claimed is:

1. A detection device for a digital torque adapter which is connected with a wrench or a socket, comprising:
a case having an operation area and a display area respectively defined in an outside thereof, a torque strain axle extending through two opposite ends of the case and having a recess defined in a first end thereof, a second end of the torque strain axle being exposed beyond the case;
a circuit board located in the case and electrically connected to the operation area and the display area, the circuit board including a receiving unit and a setting unit, the operation area including a start button which is pushed to activate the circuit board so as to operate the setting unit, the circuit board being reset by pushing the start button two times rapidly, the circuit board being shut off by pressing the start button for three seconds, the operation area including an up button and a down button, the up button and the down button adjusting a pre-set value of angle set by the setting unit, the case having a torque strain gauge located therein which is attached to an outer surface of the torque strain axle to detect a value of torque which is transferred to the receiving unit, the circuit board including a screen which is located at the display area, and an angle sensor located in the case and detecting an angle of the case and the torque strain axle relative to a horizontal plane, the angle sensor detecting the angle which is transferred to the receiving unit and displayed on the screen, an accumulator electrically connected to the circuit board and accumulating the angle detected by the angle sensor of each time that the wrench rotates, until a sum of the accumulated angles meets the pre-set value of angle of the setting unit, the display area displaying the value of torque and the sum of the accumulated angles.

2. The detection device for a digital torque adapter as claimed in claim 1, wherein the accumulator accumulates the angles detected by the angle sensor by way of phase accumulation.

3. The detection device for a digital torque adapter as claimed in claim 2, wherein the angle sensor is a gyroscope integrated circuit.

4. The detection device for a digital torque adapter as claimed in claim 1, wherein the operation area includes a measurement system selection button, two measurement systems set in the setting unit of the circuit board are selected by pressing the unit selection button, the measurement systems of the circuit board include a metric system Nm and Kg·cm, and an English system lbf·in and lbf·ft.

5. The detection device for a digital torque adapter as claimed in claim 4, wherein the operation area includes a set button, a pre-set value of the setting unit of the circuit board is adjusted by pressing the set button, the up button and down button are operated to adjust digits of the pre-set value of the setting unit.

6. The detection device for a digital torque adapter as claimed in claim 5, wherein the operation area includes a mold selection button, the mold selection button selects one of a tracking mode, a peak mold and an angle mold that are built in the setting unit of the circuit board, wherein when the tracking mode is chosen, a pre-set value of torque is input to the tracking mold, the tracking mode tracks a value of torque of each time that the wrench rotates, and displays the value of torque on the screen, and the value of torque jumps to the pre-set value of torque when the wrench is stopped to rotate and released, wherein when the peak mold is chosen, a pre-set value of torque is input to the peak mold, the peak mold detects the value of torque of each time that the wrench rotates and displays the value of torque on the screen, and a final value of torque is displayed on the screen, the screen flashes for seconds and then displays the pre-set value of torque, or the start button is pressed to initialize the peak mode, wherein when the angle mode is chosen, a pre-set value of angle is input to the angle mold and the screen displays the angle of each time that the wrench rotates, the screen cross-displays the final value of angle and the value of torque when the wrench is stopped, and the screen flashes for seconds and then displays the pre-set value of angle, or the start button is pressed to initialize the angle mode.

7. The detection device for a digital torque adapter as claimed in claim 6, wherein the operation area includes a turn button, a display pattern of the screen is rotated by pressing the turn button.

8. The detection device for a digital torque adapter as claimed in claim 7, wherein the case includes a buzzer and at least one warning light 9, the buzzer and the at least one warning light are electrically connected to the circuit board, when the value of torque that the wrench outputs is smaller than 80% of the pre-set value of torque, the at least one warning light turns on and displays a first color, when the value of torque that the wrench outputs is larger than 80% of the pre-set value of torque, the at least one warning light turns on and displays a second color, and the buzzer generates a first sound at a first frequency, when the value of torque that the wrench outputs is close to 95% of the pre-set value of torque, the at least one warning light turns on and displays the second color, and the buzzer generates the first sound at a second frequency, when the value of torque that the wrench outputs reaches 100% of the pre-set value of torque, the at least one warning light turns on and displays a third color, and the buzzer generates a second sound which is a continuous sound, the buzzer turns silent the when the wrench is stopped to rotate.

9. The detection device for a digital torque adapter as claimed in claim 8, wherein the at least one warning light turns on and displays a first color when an angle that the wrench rotates is less than 80% of the pre-set value of angle, when the value of angle that the wrench rotates is larger than 80% of the pre-set value of angle, the at least one warning light turns on and displays a second color, and the buzzer generates a first sound at a first frequency, when the value of angle that the wrench rotates is close to 95% of the pre-set value of angle, the at least one warning light turns on and displays the second color, and the buzzer generates the first sound at a second frequency, when the value of angle that the wrench rotates reaches 100% of the pre-set value of angle, the at least one warning light turns on and displays a third color, and the buzzer generates a second sound which is a continuous sound, the buzzer turns silent the when the wrench is stopped to rotate.

10. The detection device for a digital torque adapter as claimed in claim 9, wherein the case includes a power supply, the screen displays electric power status of the power supply.

* * * * *